United States Patent [19]

Ozaki et al.

[11] Patent Number: 4,837,640
[45] Date of Patent: Jun. 6, 1989

[54] METHOD AND APPARATUS FOR DETECTING A CONTROL SIGNAL

[75] Inventors: Shinya Ozaki; Tadashi Fukami, both of Kanagawa; Kentaro Odaka, Tokyo, all of Japan

[73] Assignee: Sony Corporation, Tokyo, Japan

[21] Appl. No.: 64,829

[22] Filed: Jun. 19, 1987

[30] Foreign Application Priority Data

Jun. 28, 1986 [JP] Japan .................. 61-152205

[51] Int. Cl.$^4$ .................... G11B 5/02; G11B 15/18
[52] U.S. Cl. ................................ 360/27; 360/72.2
[58] Field of Search ............. 360/48, 49, 27, 72.2; 371/69

[56] References Cited

U.S. PATENT DOCUMENTS 3,863,215  1/1975  McGrogan, Jr. ............... 371/69

Primary Examiner—Vincent P. Canney
Attorney, Agent, or Firm—Philip M. Shaw, Jr.

[57] ABSTRACT

The present invention is concerned with a method and apparatus for detecting control signals recorded on a continuous recording area on the recording medium at an elevated speed. When k out of n past read-out control signals have been read correctly as being the prescribed control signal, the signal is concluded to be the prescribed control signal. It is possible in this manner to read out the control signals accurately even when the error rate is high, as during high speed searching.

10 Claims, 6 Drawing Sheets

METHOD AND APPARATUS FOR DETECTING A CONTROL SIGNAL

BACKGROUND OF THE INVENTION

1. Field of the Invention

This invention relates to a method and apparatus for detecting a control signal and more particularly to such a method for detecting an identification signal in a digital signal reproducing device.

2. Description of the Prior Art

Recently, in association with the progress in the art of signal processing, it has become customary to record control signals concerning record contents or the operating conditions simultaneously with the recording of audio or video signals on the recording medium. For example, in a rotary head type digital audio tape recorder or so-called R-DAT, record tracks are formed obliquely on a magnetic tape used as the recording medium, and control signals called sub-code signals are formed in a sub-code area on each track in addition to the audio PCM data per se.

The control signals recorded in the sub-code area include start identification or start ID signals indicating the start of the recorded program. For example, in the leading part of a program, such as music, the start ID bits of "1" are recorded for an interval of 9 seconds, so that finding the leading part of a number or program searching can be done by detecting these start ID bits at the time of reproduction.

In these R-DATs, the error rate becomes rather high during high-speed searching, such as during 200-times normal speed searching, so that it becomes extremely difficult to read out the control signals including the aforementioned start ID signals.

OBJECT AND SUMMARY OF THE INVENTION

It is a principal object of the present invention to provide an improved method for detecting a recorded control signal wherein reading of the control signal, such as a start identification signal, can be assured with high reliability even when the error rate is high such as at the time of high speed searching.

The present invention attains these objects by providing a method for detecting control signals recorded on a recording medium, comprising the steps of:

checking a series of n read-out control signals, n being an integer equal to or more than 2; and determining that a prescribed control signal has been recorded when not less than k, where k is an integer not less than 2, prescribed control signals have been detected without error out of n control signals checked.

DESCRIPTION OF THE PREFERRED EMBODIMENT

Figure 1:
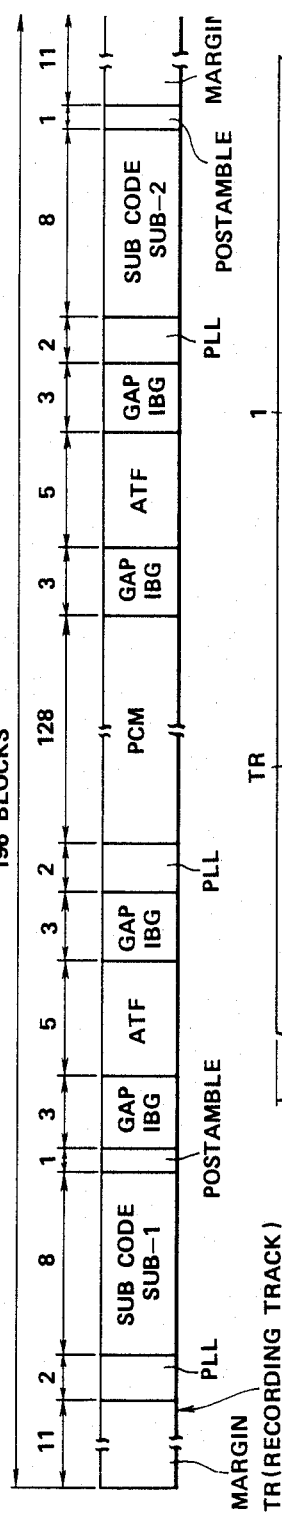
FIGS. 1 and 2 show typical track and tape recording formats in a rotary head type digital audio tape recorder, respectively.
Figure 2:
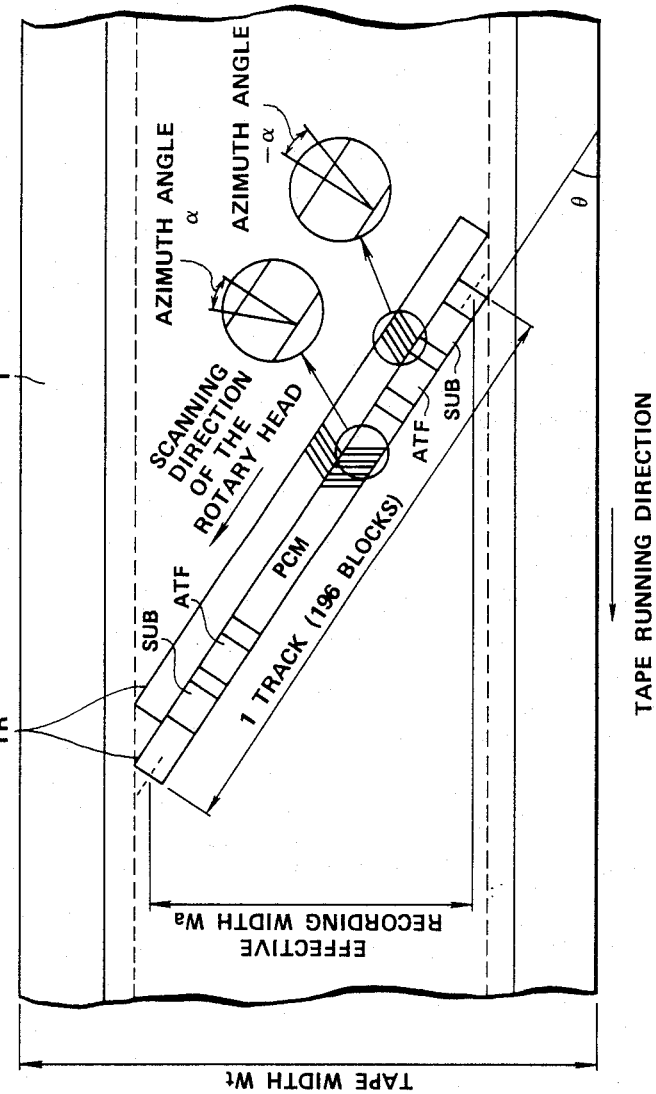

When recording audio or video signals on a recording medium, control signals concerning record contents or operating conditions are recorded thereon simultaneously. For example, in a rotary head type digital audio tape recorder, or so-called R-DAT, recording tracks TR, having the track format as shown in FIG. 1, are recorded obliquely on a magnetic tape 1 used as the magnetic recording medium, as shown in FIG. 2. Thus, in addition to the data per se, that is, audio PCM data, control signals called sub-code signals are recorded at prescribed positions on each track TR.

Referring to FIGS. 1 and 2, each recording track TR is formed by, for example, 16 recording sections. Thus, on both sides of the audio PCM data record section, there are formed pilot signal recording sections for automatic track finding ATF and, outside of these recording sections ATF, there are formed and recorded sub-code signal recording sections SUB-1 and SUB-2 for recording of various control signals. The numerals in FIG. 1 denote the number of blocks assigned to the associated recording blocks, with one track consisting of 196 blocks.

Figure 3:
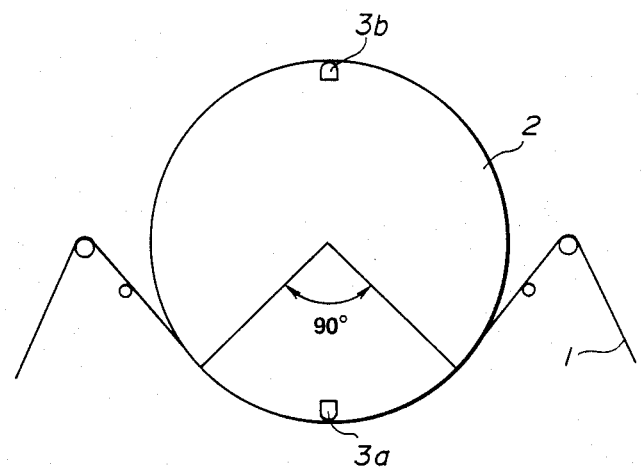
FIG. 3 is a diagrammatic view showing the rotary head device.

FIG. 3 shows diagrammatically the rotary head unit of the aforementioned R-DAT. The magnetic tape 1 is driven past a rotary drum 2 of a rotary head unit while it is in direct frictional contact with the drum periphery over an angular extent of about 90°. A pair of rotary magnetic drums $3a$, $3b$ are provided to the rotary drum 2 of the rotary head device with an angular interval of 180° from each other.

As an example of the specifications for the aforementioned R-DAT, the width Wt of the magnetic tape 1 is 3.81 mm, the effective recording width of the digital data is 2.61 mm, the tape speed is 7.20 mm, the overall length of the inclined recording track TR is 23.5 mm, the track pitch is 12.0$\mu$, the inclined angle $\Theta$ of the recording track TR is 6°22' and the azimuth angle $\alpha$ is ±20°. The diameter and the r.p.m. of the rotary drum 2 may, for example, be 30 mm and 2000 r.p.m., respectively. The relative speed of the rotary magnetic head 3 relative to the tape 1, that is, the speed of head movement or scanning on the track TR, is equal to 3.13 m/s.

Figure 4:
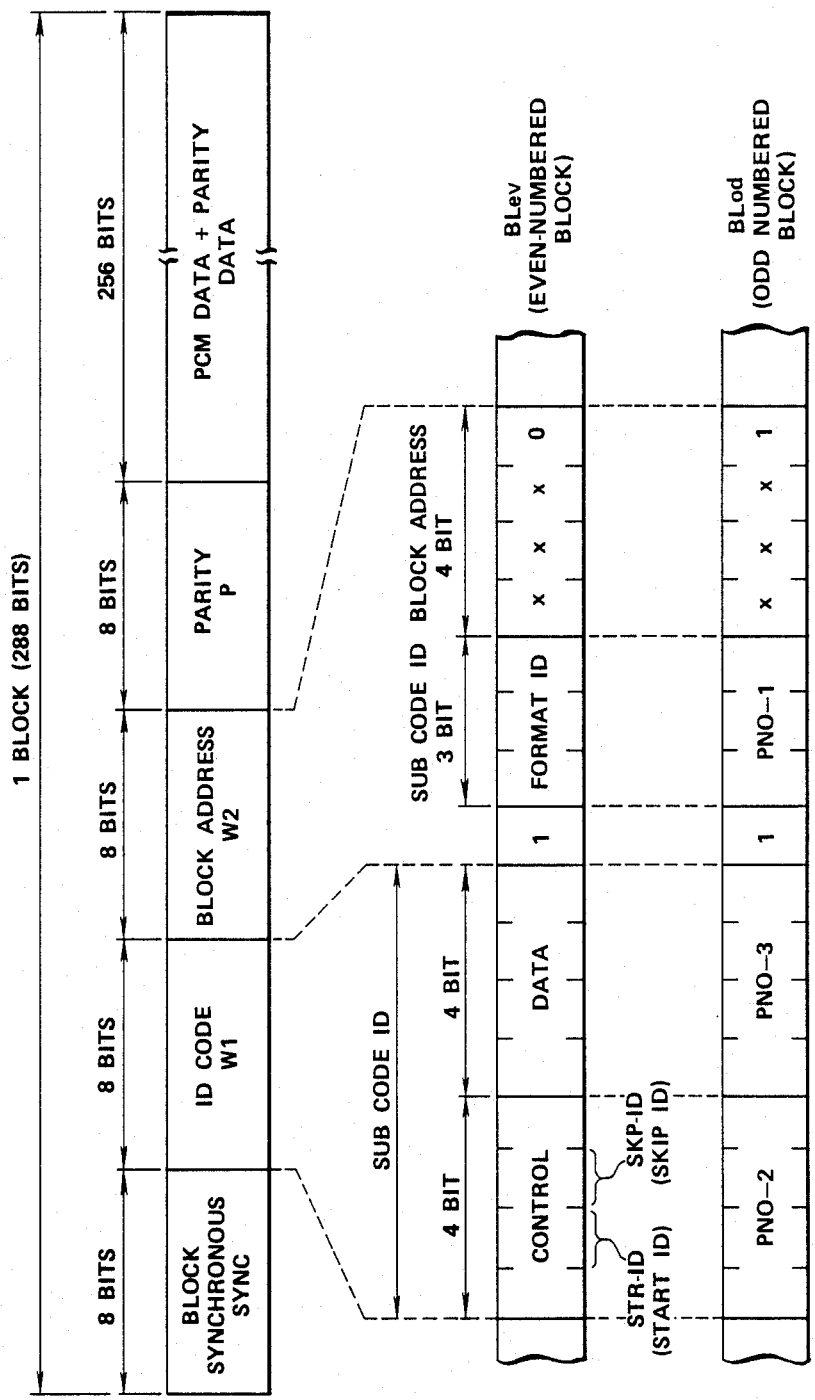
FIG. 4 shows a format of one block in the track format of FIG. 1.

Referring to FIG. 4, each of the 196 blocks for one track is formed by 288 bits, that is, 8 bits of the block sync part Sync, 8 bits of the identification code or ID code W1, 8 bits of the block address part W2, 8 bits of the parity P and 256 data bits of the PCM or sub-code data, looking from the leading end of the block. The parity P is obtained by an exclusive OR or modulo 2 addition operation of the ID code part W1 and the block address part W2.

It is noted that 128 of the aforementioned blocks are arranged in the PCM data recording section PCM shown in FIG. 1 while 8 of these blocks are arranged in each of the sub-code recording blocks SUB-1 and SUB-2. The ID code part W1 and the block address part W2 in each of the blocks of the sub-code recording blocks SUB-1 and SUB-2 have different contents depending on whether the block number is an odd number or an even number, that is, for the even-numbered blocks (block numbers 0, 2, 4 and 6) and for the odd-numbered blocks (block numbers 1, 3, 5 and 7), see FIG. 4.

In the even-numbered block Blev, the 8 bits of the ID code part W1 are formed by 4 bits of the control ID and 4 bits of the data ID, while the 8 bits of the block address part W2 are formed by a leading bit "1", the next 3 bits of the format ID and the next following 4 bits of the block address. Each of the ID code part W1 and the block address part W2 of the odd-numbered blocks Blod is formed by a 4-bit program number PNO-2, a 4-bit program number PNO-3 and a 3-bit program number PNO-1, in this order, while a bit "1" is interposed between the program numbers PNO-3 and PNO-1 and a 4-bit block address is arranged after the program number PNO-1.

In the 4-bit control ID of the even-numbered block Blev, there are recorded a start ID bit or STR-ID bit and a skip ID bit SKP-ID, see FIG. 4. For example, at the leading part of a program, such as a music number, the start ID bit STR-ID of "1" is recorded for about 9 seconds to facilitate the finding of a head part of a music number or for program searching. At the middle part of a program, the start ID bit STR-ID of "0" is recorded.

Figure 5:
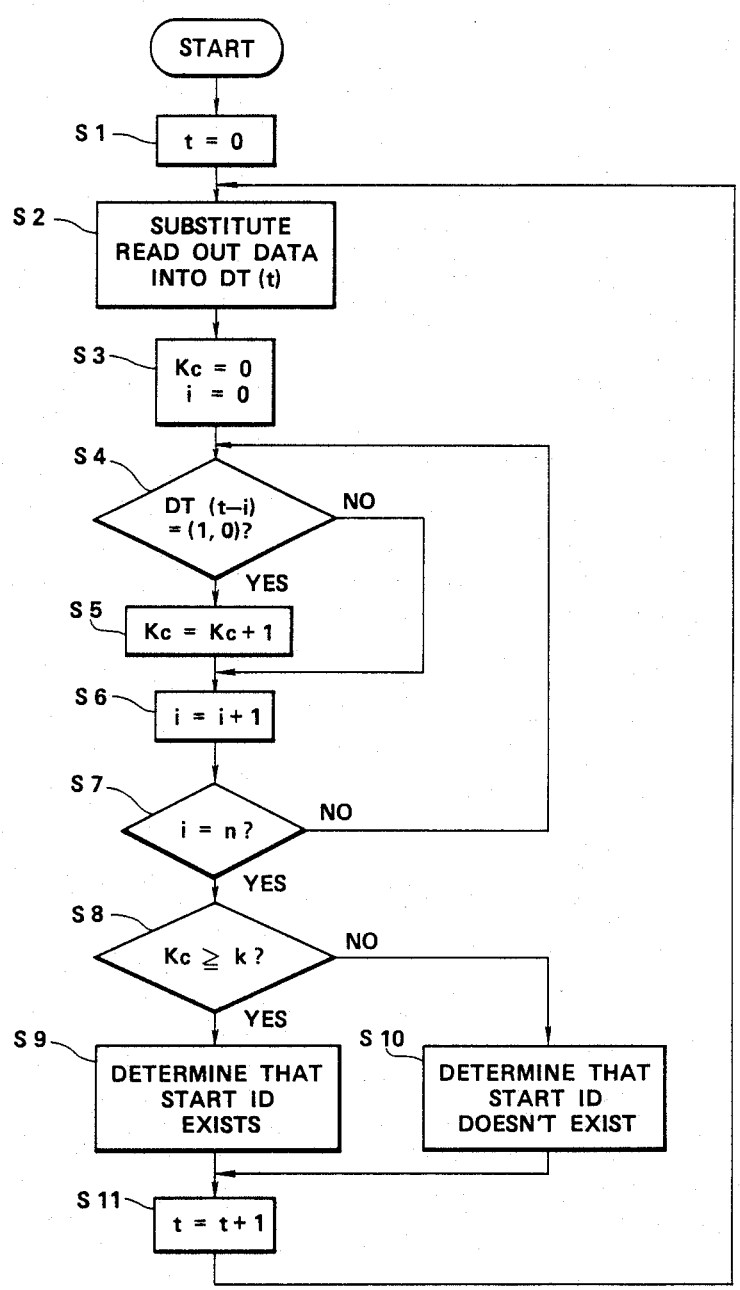
FIG. 5 is a flow chart for explaining the operation of detecting the start ID signal in a method for detecting a control signal according to an embodiment of the present invention.

FIG. 5 shows a flow chart for explaining the operation of the method carried out by a microprocessor control system in the system controller 17, as will be described in greater detail in reference to FIG. 7, for detecting the control signals, such as start ID signals, according to a preferred embodiment of the present invention. Thus, it illustrates a typical operation for detecting the start ID signal in the rotary head type digital tape recorder or so-called R-DAT for a high-speed search mode at, for example, 200-times normal speed. In the present example, when k out of n detected control signals are determined to be the correct start ID signals, this is regarded as indicating the leading or beginning part of a program, such as the music number.

In the example of FIG. 5, at a step S1 immediately following the start of retrieval of the start ID, a variable t indicating a certain time point as will be described and related with the number of times the start ID is detected, is set to zero. Then, control proceeds to the next step S2 to read the signals during the high speed searching. In this step S2, a flag P-FLG indicating the result of checking of the parity P and the start ID bit STR-ID in the sub-code recording block shown in FIG. 4 is read and substituted into an array variable DT(t). It is assumed that no error has occurred when the flag P-FLG is "0" and that an error has occurred when the flag is "1". The variable t in the array variable DT(t) is used as a certain time point indication that is temporally incremented by "1" each time the sub-code having the aforementioned start ID bit STR-ID is detected. The value of the array variable DT(t) is represented for example by a 2-bit binary number of which the first and second bits correspond to the aforementioned start ID bit STR-ID and the flag P-FLG, respectively.

In the next step S3, a counting variable Kc and a variable i are both set to '0' before control proceeds to the step 4. In this step 4, it is determined whether the value of the array variable DT(t−i) is (1, 0). That is, when the start ID bit STR-ID is "1" thus indicating the leading position of the program, such as music, is the aforementioned flag P-FLG simultaneously "0", thus indicating that no error has occurred? If the result of the decision at the step S4 is 'YES' the control proceeds to the step S5. When these conditions are not met simultaneously, the result of the decision at the step S4 is 'NO' and control then proceeds to the step S6. In the step S5, the counting variable Kc is incremented by "1" (Kc=Kc+1), and control then proceeds to the next step S6.

In the step S6, the variable i indicating the number of times the aforementioned start ID bit STR-ID is detected is incremented by "1" (i=i+1) before control then proceeds to the next step S7 where it is decided whether the variable i is equal to a predetermined number n. When the result at step 7 is NO, control returns to step 4 to again decide sequentially the values of the array variable DT(t−i). Depending on the contents of decision at step 4, the counting operation is continued using the variable Kc. The above sequence of operations is performed repeatedly until the variable i becomes equal to the number n, in order to check for n start ID bits and flags P-FLG. The number "n" is an integer which is not less than 2.

When the result of decision at the step S7 is YES, control then proceeds to the next step S8 in order to decide whether the counting variable Kc is not less than the aforementioned number k, that is whether or not less than k start ID signals exist in the detected n control signals. When the result of decision at this step S8 is YES, control then proceeds to step S9. In this step, it is concluded that the detected signal certainly indicates the start ID, and control then proceeds to step S11. When the result is NO, control then proceeds to step S10. In this step S10, it is concluded that the detected signal does not indicate the start ID, and control then proceeds to step S11. The conclusions made at steps S9 and S10 by the controller 17 are converted into electronic signals to control the searching operation. In step 11, the variable t is incremented by "1" (t=t+1), and control then returns to the step S2. The consequence of the determination at the step S9 means the detection of the leading part of each program. The consequence of the determination at the step S10 means that the leading part of the program has not been detected. The controller 17 counts the number of programs by counting the determinations at the step S9. Then the controller 17 changes the search mode to the playback mode in response to the count of the number of programs so that program searching can be carried out.

Figure 6A:
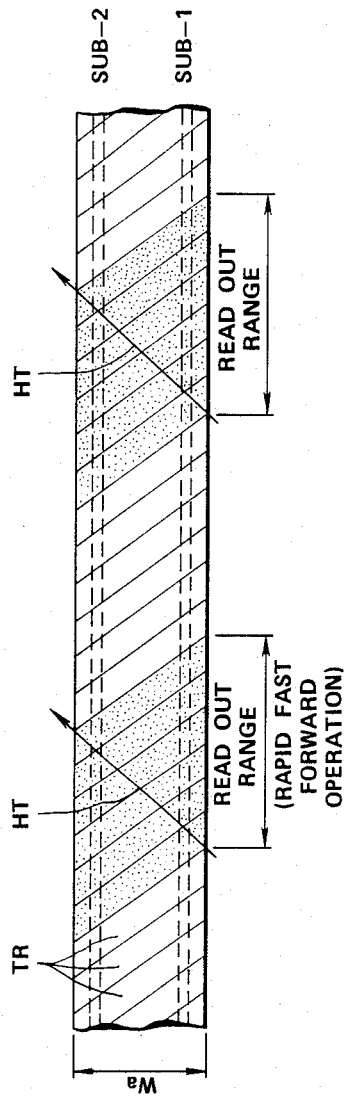
FIGS. 6A and 6B are plan views showing head traces against the tracks on the tape during high-speed searching.
Figure 6B:
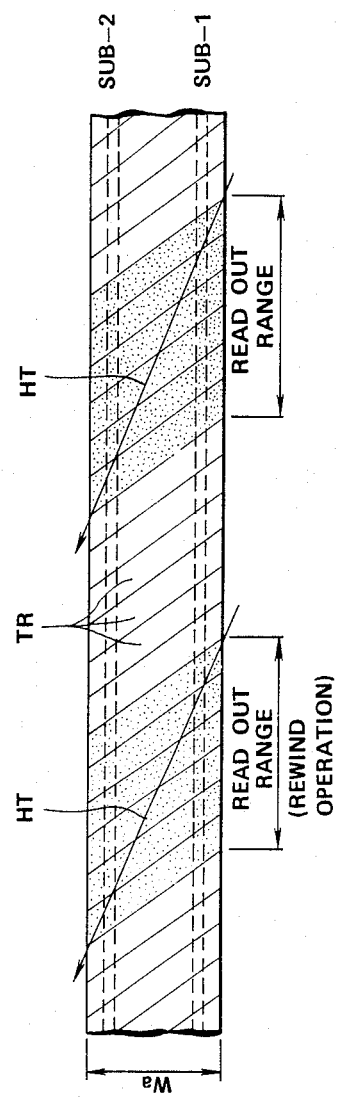

It is noted that, during the high-speed search operation as described above, head traces HT are delineated against the inclined recording tracks TR on the magnetic tape as shown for example in FIGS. 6A and 6B which represent the states for rapid fast forward and rewind operations, respectively. The aforementioned sub-code recording sections SUB-1 and SUB-2 where the start STR-ID are recorded are disposed slightly towards both side edges within the effective recording width Wa of the magnetic tape shown in FIG. 2. Thus, the sub-codes are read twice for each scanning of the magnetic head in association with the aforementioned sub-code recording blocks SUB-1 and SUB-2. As described previously in connection with FIG. 8, each eight blocks are formed in the sections SUB-1 and SUB-2 and the start ID bit STR-ID is recorded in each of the four even-numbered blocks. The start ID bit is detected once for each of the sub-code record sections SUB-1 and SUB-2 by taking a majority of the four start ID bits STR-ID. Therefore, the start ID bit is detected four times during one complete revolution of the 2-head rotary drum. However, since it is for about 9 seconds of the leading portion of the program, such as the music number, that the start ID bit STR-ID becomes "1", the state of "1" of the ID bit can be checked for only 9/N seconds during the N-times normal speeding reading. For example, at twice normal speed reading the ID bit can be checked for only 9/2 seconds.

In the U.S. application No. 791,518 filed on Oct. 25, now U.S. Pat. No. 4,630,142, the present Appicant has already proposed a system and method of controlling the rotation of the rotary drum so that the relative speed of the rotary head to the magnetic tape during the variable speed reproduction, such as high speed searching, is equal to that during the normal speed reproduction. When the relative speed between the head and the tape should be maintained to be constant in this manner by servo control, the number of times the aforementioned start ID bit STR-ID in the sub-code is read to be "1" during the N-times normal speed reproduction is approximately given by the formula $$m = |3 + 1200/N|$$

wherein N is positive and negative in sign during rapid feed and rewind operations, respectively, and satisfies the relation $$-200 \leq N \leq 200$$

Therefore, the aforementioned number of times m for rapid feed during the 200-time high speed search mode is 9, while the same number of times for rewind is 3. The value of m for rapid feed and rewind for 150-times normal speed search mode is 11 and 5, respectively, while that for 100-times normal speed search mode is 15 and 9, respectively. Since the number of times m that the start ID bit can be read to be "1" is limited, and the error rate is mostly low, the decision to the effect that the start-ID is positively recorded to indicate the beginning of a program such as music is given only when not less than k out of the past n read-out data can be recognized as indicating the valid start ID.

Figure 7:
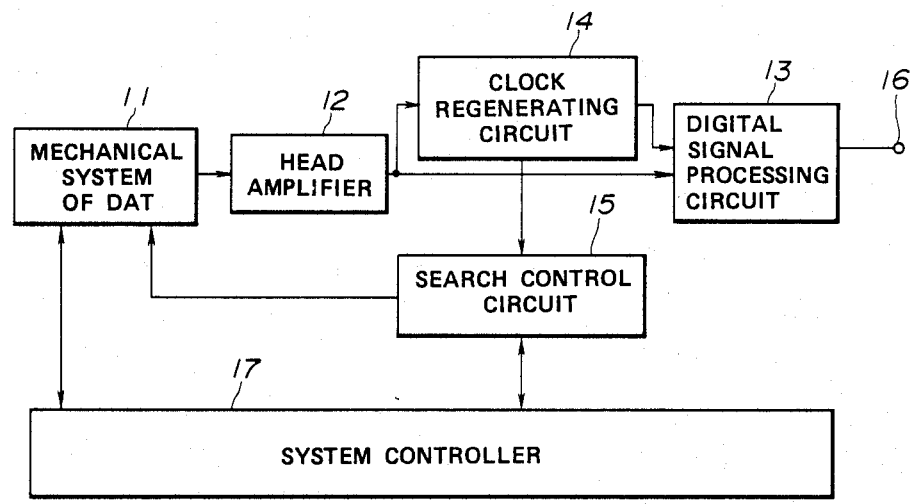
FIG. 7 is a block diagram showing an example of the signal reproducing system employed in the embodiment of FIGS. 1 to 6.

A practical example of the signal reproducing system for realizing such operation is described briefly by referring to FIG. 7. In this figure, playback signals from a mechanical system 11 of a digital audio tape recorder DAT including a rotary head device, tape running system and a tape cassette are transmitted to a digital signal processing circuit 13 through a so-called head amplifier 12 including, for example, a playback equalizer circuit. Clock signals are taken out from output signals of the head amplifier 12 by a clock regenerating circuit 14 making use of PLL circuit. These clock signals are transmitted to the digital signal processing circuit 13 and a search control circuit 15.

In the digital signal processing circuit 13, error correction, decoding of the sub-code signals and digital to analog conversion are performed, such that audio signals converted into the analog form are taken out at an output terminal 16, while the sub-code signals are supplied to a system controller 17 making use of a microprocessor, as an example. Not only clock signals from a clock regenerating circuit 14 but also signals from the head amplifier 12 are supplied to the search control circuit 15, while the information is exchanged between the search control circuit 15 and the system controller 17.

During the search mode, the search control circuit 15 controls a reel motor control circuit or a servo drive circuit such as a drum motor of the rotary head of the mechanical system 11 of the DAT of the basis of these signals to effect the search operation.

When the art shown in the aforementioned U.S. Pat. No. 4,630,142 is employed, the drum or reel motor is controlled so that the relative speed between the tape and the rotary head is made to be equal to that during normal reproduction by virtue of the search control circuit 15.

In this manner, the error flag by the parity check and the start ID bit in the sub-code signals are sequentially read while the relative speed between the tape and the head is maintained to be constant during the high speed searching and, when k out of n read-out signals have been read correctly, this is regarded as indicating the positive start ID. It is assumed that the following data strings start ID bits . . . 001100101100 . . .

error-flag . . . 010010010110 . . .

have been obtained for n=5 and k=3, as an example. In these data strings, three sets (0, 1) are included in the five detection results from the 3rd to the 7th detecting operation, this being regarded as indicating the start ID. Although the start ID bit of "1" occurs three times in the five detection results from the 7th to the 11th detecting operation, this is not regarded as indicating the start ID since the error flag of "0" indicating no error occurs only twice.

In this manner, when not less than k out of n read-out signals have been read correctly, this is regarded as indicating a start ID, so that the start ID can be detected with high operational reliability even when the error rate is poor as during high speed searching. For example, under adverse conditions with the error-rate not lower than 10% and the mistaken detection rate not lower than several percent, the possibility of missing the start ID is only approximately once per 500 music numbers, while the possibility of mistaken detection of the start ID is only approximately 0.1 time per each tape roll.

The method for detecting the control signals according to a modified embodiment of the present invention will be explained by referring to FIG. 8. In the present modification, it is only when not less than k out of n past detection results indicate the start ID correctly, with the error flag being "0", and the number of occurrences of the set of the error flag equalling "0" (indicating no error) and the start ID equalling "0" is not larger than l1 being for example 0, that the decision is given that there exists the start ID.

Figure 8:
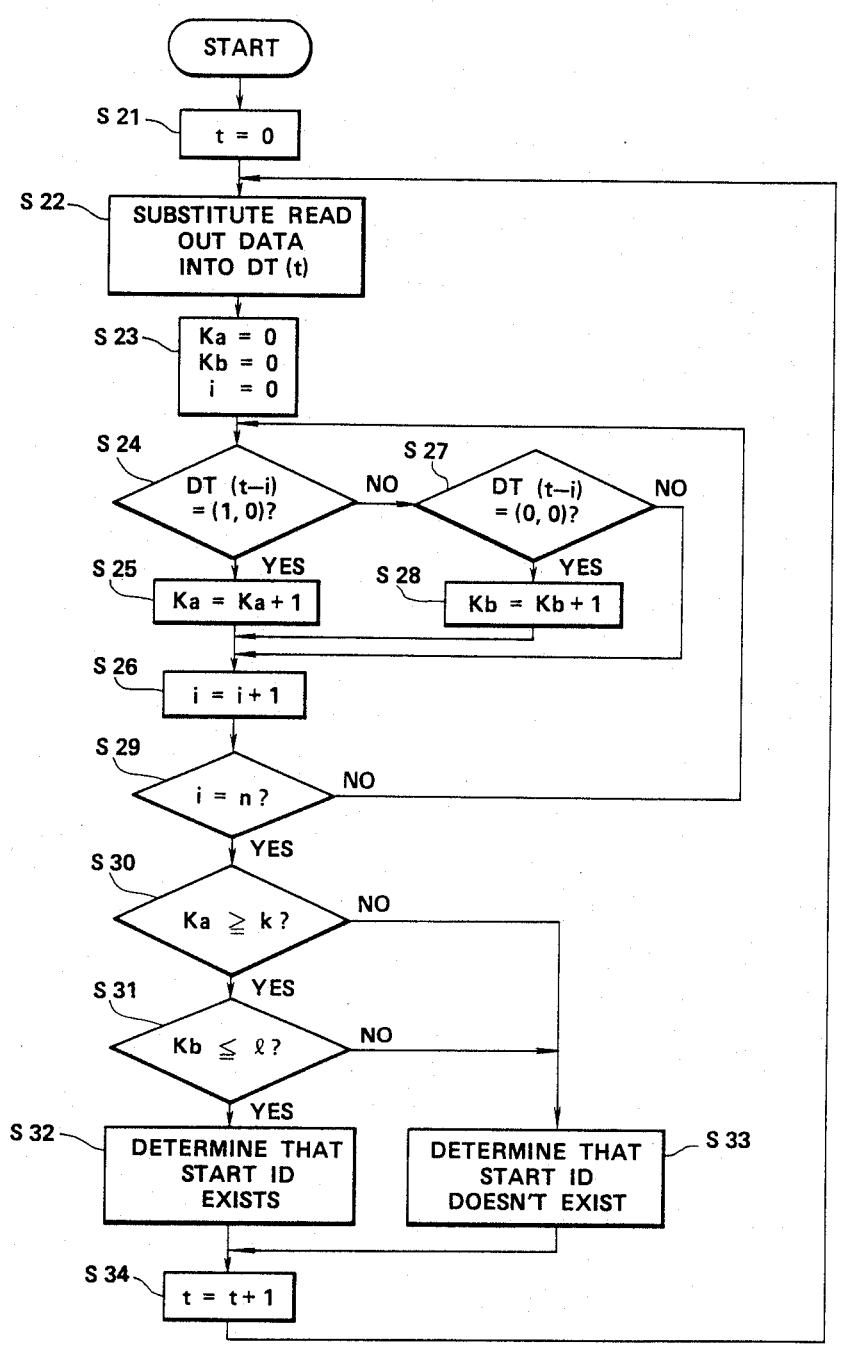
FIG. 8 is a flow chart for explaining the operation of a modified embodiment of the present invention.

The steps S21 to S25 shown in FIG. 8 correspond approximately to the steps S1 to S5 in FIG. 5. Thus, in the step S21, the variable t indicating a certain time point is set to "0". In the next step S22, the read data (start ID bit STR-ID and the flag P-FLG indicating the result of decision of the parity P) are introduced into the array variable DT(t). In the next step S23, the counting variables Ka, Kb and the variable i are all set to "0" before control proceeds to the next step S24. In this step S24, it is concluded whether the value of the read data DT(t) is (1, 0) as at the step S4 in FIG. 5.

When the results of decision at step S24 are YES, control then proceeds to the next step S25, where the counting variable Ka is incremented (Ka=Ka+1), before control then proceeds to the next step S26. When the results of decision at the step S24 are NO, control then proceeds to the step S27 where it is concluded whether the value of DT(t−i) is (0, 0). Thus, when the start ID bit is "0" and the error flag is also "0" showing that there is no error, it is highly likely that this state does not indicate the start position. When this state is detected frequently, it is advisable not to give a decision that the position is the start position. Thus, when the result of decision at the step S27 is YES, control proceeds to the step S28 where the counting variable Kb is incremented (Kb=Kb+1) to count the number of times of detection of the set (0, 0), before control then proceeds to the next step S26. When the result of decision at the step S27 is NO, control then proceeds directly to the step S26.

In the step S26, the variable i is incremented by 1 (i=i+1) and control then proceeds to the next step S29 where it is determined whether the variable i is equal to the prescribed value n. When the result of decision is NO, control returns to the step S24 where the value of the array variable DT(t−i) is assessed sequentially and the counting is performed using the variables Ka and Kb in accordance with the contents of the decision. The above sequence of operations is repeated until the value i is equal to the value n. When the result of decision at the step S29 is YES, control then proceeds to the next step S30 where it is determined whether the counting variable Ka is not less than the value k. When the result of decision at the step S30 is YES, control then proceeds to the step S31 where it is determined whether the counting variable Kb is not larger than the predetermined value l. It is only when the result of decision at the step S31 is also YES that control then proceeds to the step S32 where it is concluded that the detected signal certainly indicates the aforementioned start ID. Then, control proceeds to the next step S34. When the result of decision at the step S30 is No or when the result of decision at the step S31 is NO, control then proceeds to the step S33 where it is concluded that the read-out signal does not indicate the start ID. Then, control proceeds to the next step S34. In this step, the variable t is incremented (t=t+1), and then control is returned to the step S24.

By the above described operation, the start ID can be detected more reliably since the decision that the start ID exists is given only when not less than K out of n past read-out signals have been detected as "1" correctly (with the P-FLG equal to "0" or with no error) and the number of signal sets consisting of the start ID bit of "0" and the flag P-FLG of "0" out of the remaining signal sets is not more than l. This means that the data (1, 0) should be obtained in an area where there exists the start ID, but the data (0, 1), (1, 1) and 0, 0) may also be obtained in case of an error. When an error is caused, the error flag most probably becomes "1", that is, the error detection is made, so that the probability $P_M$ that the data (0, 0) is obtained is low. Thus, when the number of occurrences of the signal sets (0, 0) exceeds l+1, the decision should be given that the area is devoid of the start ID. In this case, the probability of missing the start ID becomes a function of $PM^L$ so that the change of missing is significantly reduced. It is also possible by this effect to reduce the value of the number n.

The present invention is not limited to the above described embodiments. For example, it may be applied to the detection of various control signals, in addition to the detection of start ID signals for R-DAT.

What is claimed is:

1. A method for detecting control signals, each of which is recorded among other signals on a recording medium, comprising the steps of electronically;
   reproducing the signals recorded on the medium and detecting the control signals;
   checking n of a series of the reproduced control signals for error, n being an integer equal to or more than 2; and
   determining that a prescribed control signal has been recorded when not less than k of the prescribed control signals have been detected without error out of n of the control signals checked.

2. A method according to claim 1 wherein said determining step includes the steps of checking the error in the control signal and generating an error flag indicating the presence or absence of the error.

3. A method according to claim 1 or 2 wherein said checking step comprises detecting a start identification signal recorded by a rotary head in a specified section on the tape and which signal has a prescribed value for a predetermined starting area of the recorded program.

4. A method according to claim 3 wherein said checking step is performed when the control signal is reproduced by the magnetic head as the tape is running at an elevated speed.

5. A method for detecting a control signal recorded other signals on the recording medium, comprising the steps of electronically:
   reproducing the signals recorded on the medium and detecting the control signal;
   checking a series of n of the reproduced control signals each having two states, n being an integer not less than 2;
   checking n number of the control signals for error, counting the number of the control signals of one state without error and the number of the control signals of the other state without error; and
   concluding that the control signal of one state is recorded when the number of the control signals of one state is not less than k and the number of the control signals of the other state is not larger than l, k being an integer lesser than n and l being an integer lesser than k and including zero.

6. An apparatus for detecting control signals, each of which is recorded among other signals on a recording medium, comprising;
   means for reproducing the signals recorded on the medium and detecting the control signals;
   means for electronically checking n of a series of read-out control signals for error, n being an integer equal to or more than 2; and
   means for electronically determining that a prescribed control signal has been recorded when not less than k of the prescribed control signals have been detected without error out of n of the control signals checked.

7. An apparatus according to claim 6 wherein said checking means includes means for checking the error in the control signal and generating an error flag indicating the presence or absence of the error.

8. An apparatus according to claims 6 or 7 wherein said checking means comprises means for detecting a start identification signal recorded by a rotary head in a specified section on the tape and which signal has a prescribed value for a predetermined starting area of the recorded program.

9. An apparatus according to claim 6 wherein said checking means detects the control signal when it is reproduced by the magnetic head as the tape is running at an elevated speed.

10. An apparatus for detecting a control signal from a plurality of control signals, each one of which is recorded among other signals on a recording medium, comprising means for checking a series of n read-out control signals each having two states, n being an integer not less than 2;

means for checking n number of the control signals for error, counting the number of the control signals of one state without error and the number of the control signals of the other state without error; and means for concluding that the control signal of one state is recorded when the number of the control signals of one state is not less than k and the number of the control signals of the other state is not larger than l, k being an integer lesser than n and l being an integer lesser than k and including zero.

* * * * *